United States Patent [19]

Watanabe

[11] Patent Number: 5,402,467
[45] Date of Patent: Mar. 28, 1995

[54] PORTABLE PAGING TELEPHONE SYSTEM WITH IMPROVED RESPONSE SIGNAL VERIFICATION MODE

[75] Inventor: Kazunori Watanabe, Yokohama, Japan

[73] Assignee: Matsushita Electric Industrial Co., Ltd., Osaka, Japan

[21] Appl. No.: 951,750

[22] Filed: Sep. 28, 1992

[30] Foreign Application Priority Data

Oct. 9, 1991 [JP] Japan .................................. 3-261714

[51] Int. Cl.⁶ .......................................... H04M 11/00
[52] U.S. Cl. ........................................ 379/57; 379/58; 379/59
[58] Field of Search .................... 379/57–59, 379/61, 63, 357; 340/311.1

[56] References Cited

U.S. PATENT DOCUMENTS

| | | | |
|---|---|---|---|
| 4,680,785 | 7/1987 | Akiyama et al. | 379/357 |
| 5,153,903 | 10/1992 | Eastmond et al. | 379/57 |
| 5,175,758 | 12/1992 | Levanto et al. | 379/57 |

FOREIGN PATENT DOCUMENTS 0295035 4/1990 Japan .

*Primary Examiner*—Curtis Kuntz
*Assistant Examiner*—Dwayne Bost
*Attorney, Agent, or Firm*—Stevens, Davis, Miller & Mosher

[57] ABSTRACT

A portable paging telephone system comprises a mobile telephone terminal device 4 and a base station 6 which form a speech path with a mobile station such as an automobile telephone set or a portable telephone set, as well as a wireless paging terminal device 5 connected to a mobile telephone exchange 3 and a wireless transmission device 7 connected to the wireless paging terminal device are provided. On the other hand, a wireless paging receiver is provided in the portable telephone set. When the portable telephone set is to be called, the wireless paging receiver is paged, through the wireless transmission device, by a paging signal from the wireless paging terminal device.

The portable paging telephone system provided a sufficient communication distance in a stand-by mode, reduces a power consumption and permits a compact and long-time-use portable telephone set.

3 Claims, 2 Drawing Sheets

FIG. I

PORTABLE PAGING TELEPHONE SYSTEM WITH IMPROVED RESPONSE SIGNAL VERIFICATION MODE

CROSS-REFERENCE TO RELATED APPLICATION

This application relates to U.S. Ser. No. 07/952,253 (pending) entitled "PORTABLE PAGING TELEPHONE SET" being filed by Kazunori Watanabe and assigned to the present assignee, based on Japanese Application No. 3-261773 filed on Oct. 9, 1991 and the content of which is incorporated herein by reference.

BACKGROUND OF THE INVENTION

1. Field of the Invention

The present invention relates to a portable paging telephone system for communicating with a portable telephone set.

2. Description of the Related Art

A mobile telephone terminal unit which accommodates a plurality of base stations in a prior art portable paging telephone system encodes an automobile telephone number or a portable telephone number, that is, a mobile telephone number, pages a telephone number by wireless, accepts a response signal to the paging during a short time period, commands to switch to a channel of the corresponding base station to establish a communication channel, confirms the number and connects the calling station to the paged telephone.

However, unlike the automobile telephone, the portable telephone should be compact and light weight, to facilitate carrying, and the telephone set is folded or an antenna is pushed in a stand-by mode. As a result, during the stand-by of the telephone set, an antenna gain is reduced by approximately 10 dB and a transmission distance is reduced to approximately one half due to a city propagation property of an electromagnetic wave. As a result, a service area may be reduced to one quarter.

A power consumed to watch the paging from a base station amounts to one third of a maximum speech time assuming that the stand-by time is eight hours.

JPA-2-95035 discloses an additional paging system for an automobile telephone set in which a removable paging receiver is attached to a mobile station and when a call from a base station is detected, a call signal is sent to the paging receiver. It can inform the call to a person who moves away from an automobile through the automobile telephone set which has a high receiving capacity, but it cannot be applied to the portable telephone set.

SUMMARY OF THE INVENTION

It is an object of the present invention to provide a portable paging telephone system which provides a sufficient communication distance in a stand-by mode, and is for use with a compact portable telephone set in a manner to saves reduce power consumption to enable operation for a long time.

In order to achieve the above object, the portable paging telephone system of the present invention:

1) secures a predetermined paging distance from a base station without regard to an extended or shortened position of an antenna of a portable telephone set by being adapted for use with a wireless paging receiver (provided with a built-in antenna) in the portable telephone set, in addition to a transmitter receiver of the portable telephone set, and 2) enables a maximum speech time or reduction in the size of a battery to be used in the portable telephone set to in turn reduce the size and weight of the portable telephone set by turning off a power of the transmitter-receiver during a stand-by mode so that no power is consumed, and by turning on the power only during a speech mode.

In accordance with the present system, since the system powers only the wireless paging receiver in the portable telephone set during the stand-by mode and powers the transmitter-receiver only during the speech mode, the power consumption of the portable telephone set is reduced, and long-time use, compactness and wide area communication are attained.

DETAILED DESCRIPTION OF THE PREFERRED EMBODIMENT

Figure 1:
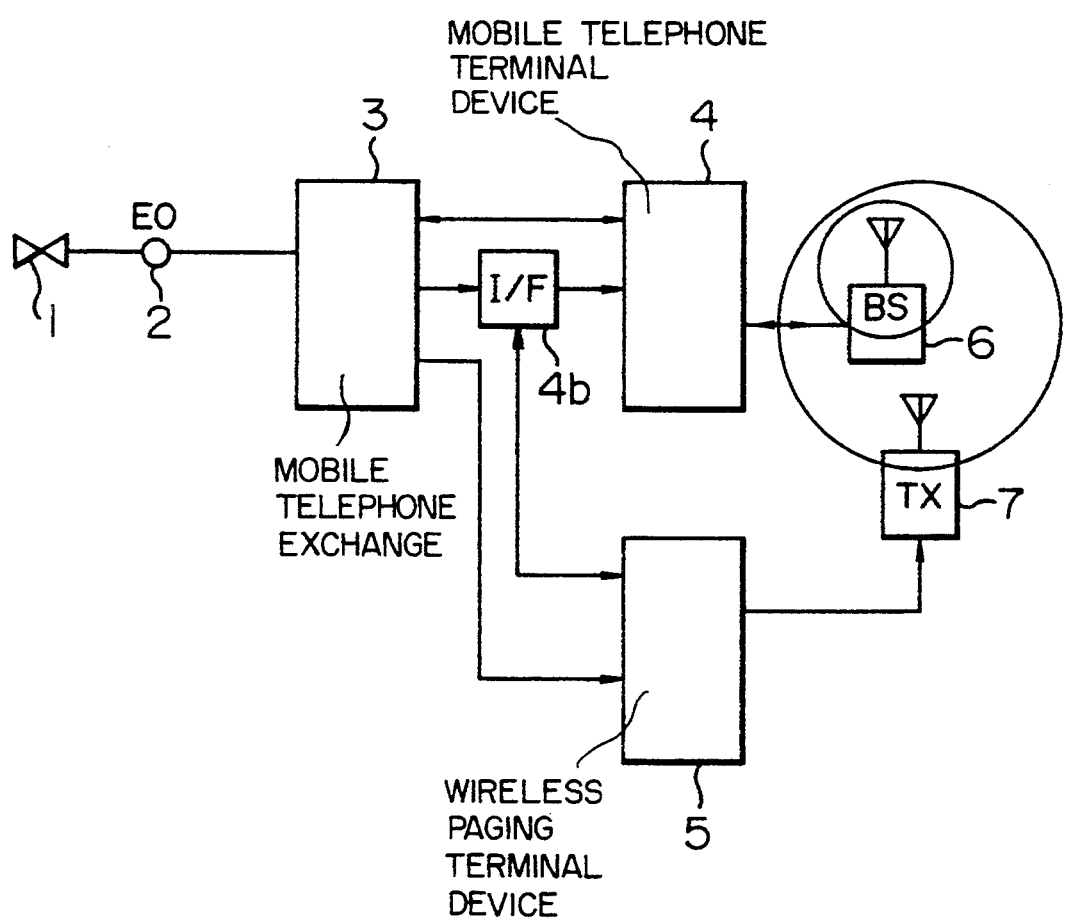
FIG. 1 shows a block diagram of an embodiment of a portable paging telephone system of the present invention.

Referring to FIG. 1, numeral 1 denotes a telephone set of a sender or a calling terminal station which is a stationary terminal station, numeral 2 denotes an end office which accommodates a plurality of stationary terminal stations, numeral 3 denotes a mobile telephone exchange connected to the end office, numeral 4 denotes a mobile telephone terminal device connected to the mobile telephone exchange, numeral 5 denotes a wireless paging terminal device connected to the mobile telephone exchange, numeral 6 denotes a wireless base station of the mobile telephone set for wireless-communicating with a portable telephone set, numeral 7 denotes a wireless paging transmission station connected to the wireless paging terminal device 5, and numeral 4b denotes an interface between the mobile telephone set and the wireless paging terminal device.

Figure 2:
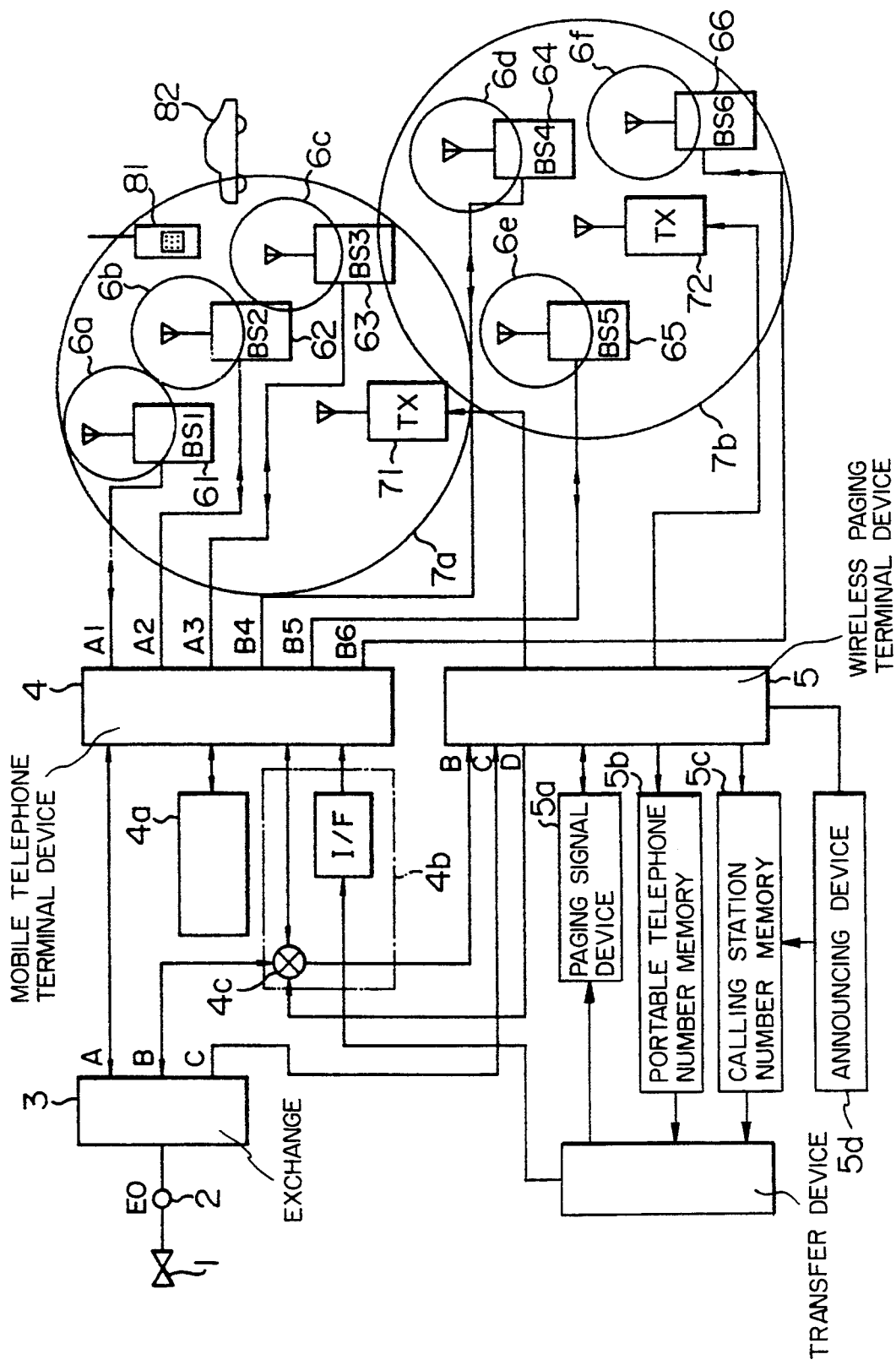
FIG. 2 shows a more detailed block diagram thereof.

FIG. 2 shows a more detailed block diagram of FIG. 1. In FIG. 2, numeral 4a denotes a mobile telephone connecting device, numeral 4c denotes a switch for switching telephone lines, numeral 5a denotes a paging signal device for generating a paging signal to be sent to the wireless paging receiver, numeral b denotes a memory for storing a portable telephone number, numeral 5c denotes a memory for storing a sending station number which has paged the portable telephone set, numeral 5d denotes an announcing device for inquiring the sending station number from the wireless paging terminal device 5, and numeral 5e denotes a transfer device of signals from memory 5b and memory 5c to devices 5d and 4b; these signals indicate various numbers such as the portable telephone number to be paged, the sending station number and a reference number. A temporary memory (not shown) for storing those numbers is provided in the interface 4b and they are utilized for the collation of an ID number of the portable telephone set which responded to the wireless paging, the sending station number and the reference number. Numerals 71 and 72 denote wireless transmission stations for wireless paging, numerals 7a and 7b denote service areas of those transmission stations and numerals 61 to 66 denote base station wireless devices for the mobile telephone set such as the automobile telephone set and the portable telephone set. The Japanese mobile telephone system uses of a paging channel (PCH) for paging the mobile telephone, an access channel (ACH) for accepting a call from the mobile telephone set, and a plurality of speech channels (SCH). The U.S. cellular mobile telephone system uses a control channel (CCH) for accepting the paging and the mobile call and identifying a speech channel, and a plurality of speech channels (SCH). The service area 7a of the transmission device 71 which pages the wireless paging receiver and sends a message covers a plurality of areas 6a, 6b and 6c of the mobile telephone base stations 61, 62 and 63.

Referring to FIG. 2, an operation of the portable paging telephone system of the present invention is explained. It is now assumed that a phone number of the portable paging telephone set sent from the calling telephone set 1 is 03-6##-***** where "03" is an area code, "6" plus two digits following the "03" indicate the call to the portable paging telephone set and a system code, and the following five digits indicate the ID number of the portable paging telephone set. Hundreds of thousands of mobile telephone sets may be registered in one system.

The phone number of the portable paging telephone set received from the end office 2 is applied to a line B of the wireless paging terminal device 5 through a line B of the mobile telephone exchange 3 and the switch 4c of the interface 4b.

On the other hand, when the calling telephone number received from the end office 2 is for a mobile telephone set, the telephone number is applied to a line A of the mobile telephone terminal device 4 from a line A of the exchange 3. The number is checked, and it is combined with the call number of the mobile telephone connecting device 4a and sent through the paging channels P-CH of the wireless base stations 61, 62 and 63 for paging. The speech channel (SCH) is designated, and the connection is made with the calling station to start the speech.

The call to the wireless paging receiver (with the built-in antenna) of the portable telephone set is applied to a line C of the wireless paging terminal device 5 from a line C of the mobile telephone exchange 3, it is coded by the paging signal device 5a and it is sent out from the wireless transmission station as a paging signal. The paging signal is sent out two or three times at a given interval.

The call signal to the portable paging telephone set applied to the line B of the wireless paging terminal device 5 is stored in the portable telephone number memory 5b. The wireless paging terminal device 5 is requested by device 5d to inform the telephone number of the calling station so as to store this telephone number in memory 5c, as a message. The telephone number of the calling station with the addition of the reference number is stored in the calling station number memory 5c. Those number data are transferred to the paging signal device 5a and the interface 4b of the mobile telephone terminal device 4 from the connecting signal transfer device 5e.

The signal of the paging signal device 5a is sent out in the same manner as a conventional paging signal, and it is received by the wireless paging receiver (with the built-in antenna) of the portable paging telephone set, and the reference number and the calling station number are stored in the memory of the wireless paging receiver of the portable telephone set as the message. The portable paging telephone set derives from this stored message a message signal for transmitting to a wireless base station device. The paging call may be made one time or several times as required to capture the portable telephone set. On the other hand, the telephone line of the calling station is switched to the mobile telephone terminal device by the switch 4c through the line D of the wireless paging terminal device 5, and the message signal from the portable paging telephone set 81 is compared with the message signal from the interface 4b. If they match, the opposite portable telephone set is connected to the telephone set of the calling station through the telephone line of the line B to start the speech.

A calling operation from the portable paging telephone set 81 is now explained. When a call is to be made from the portable paging telephone set 81, the shortened antenna is extended and the folded telephone set is expanded to power on the transmitter-receiver. Before this operation, the power has been kept off and only the wireless paging receiver intermittently receives the call signal. The wireless paging receiver can operate for receiving for one month by a single battery due to the power-conservation achieved by this invention. The reception of a call may be displayed as required.

When the wireless paging receiver (with the built-in antenna) of the portable telephone set detects a call, it rings a bell to inform the reception of the call. Alternatively, a soundless vibration by a vibration motor may be used to inform the reception of the call.

Then, the portable telephone set is activated to capture the access channel A-CH of the mobile telephone. When the telephone set is hooked off, the data of the message is sent to the base station through the channel A-CH. The base station compares the data of the message signal from the portable paging telephone set with the data of the interface 4b, and if they match, it connects the portable telephone set to the calling station through the telephone line B.

The portable paging telephone system of the present invention offers the following advantages, as seen from the above embodiment;

1) Since the wireless paging receiver is mounted in the portable telephone set to monitor the call from the base station, the transmitter-receiver need be used only during speech mode, and the power consumption during stand-by is reduced and long-time use of the telephone set is assured; and 2) Since the service area of the wireless paging receiver is broader than the service area of the mobile telephone set, wide area communication is attained.

What is claimed is:

1. A portable paging telephone system for use with portable telephone sets each having a wireless paging receiver including a message memory for recording a paging message, said system comprising:

(a) a mobile telephone exchange for receiving, from a calling station, a call signal and a message to a called portable telephone set;

(b) an interface unit with a switch;

(c) at least one paging terminal device connected to said mobile telephone exchange, said at least one paging terminal device including (1) a paging signal generator for generating a paging signal representative of a reference number, a station number of said calling station and a telephone number of said called portable telephone set and (2) a transfer device for transferring said paging signal to said interface unit;

(d) at least one mobile telephone terminal device connected to said mobile telephone exchange, for receiving a response message signal from the called portable telephone set and establishing a speech communication between the calling station and the called portable telephone set, said switch operating to switch telephone communication of a calling station to said at least one mobile telephone terminal device from said at least one paging terminal device according to a result of verification of the response message signal;

(e) a plurality of wireless base stations connected to said at least one mobile telephone terminal device, each of said wireless base stations having a capability of forming a wireless speech path with the portable telephone set; and (f) a plurality of wireless transmission devices connected to said at least one paging terminal device, said at least one paging terminal device transmitting the call signal and the paging message to the wireless paging receiver of the called portable telephone set through one of said wireless transmission devices, whereby the paging message may be recorded in the message memory.

2. A method for forming a wireless speech path between a calling terminal station and a portable paging telephone set through a paging telephone system, said portable paging telephone set having a first memory, a wireless paging receiver with a separate antenna and inform means for informing reception of a message, said paging telephone system having a mobile telephone exchange, at least one paging terminal device, at least one wireless base station, a second memory and at least one wireless transmission device, the method comprising the steps of:

(a) transmitting a message from the calling terminal station to the mobile telephone exchange, said message comprising a call signal to the portable paging telephone set, a station number of the calling terminal station and a telephone number of the portable paging telephone set;

(b) recording said message in said second memory;

(c) generating a paging signal coded from the message;

(d) paging said wireless paging receiver through air by sending out the paging signal from the at least one paging terminal device through the at least one wireless transmission device;

(e) receiving the message by said portable paging telephone set and storing the message in the first memory and informing reception of the message through said inform means;

(f) transmitting a response signal based on the message stored in said first memory from said portable paging telephone set to the at least one wireless base station;

(g) receiving said response signal by said at least one wireless base station and verifying said signal with the message stored in said second memory; and (h) connecting said portable telephone set to said calling terminal station, when said response signal matches with the message stored in said second memory.

3. A portable paging telephone system comprising:

(a) a portable telephone set, designated with a telephone number, having a wireless paging receiver, a first memory and inform means, for transmitting a response signal when the portable telephone set is able to respond to a call after receiving a call signal, said inform means informing a call therethrough when receiving a call signal;

(b) a calling terminal station, having a station number, for transmitting the call signal directed to said portable telephone set;

(c) a mobile telephone exchange for receiving a message including said call signal, said station number of the calling terminal station and said wireless paging number of the portable paging telephone set and for coding the station number into a coded station number;

(d) at least one mobile telephone terminal device connected to said mobile telephone exchange and having a second memory, for receiving said coded station number and storing the coded station number in said second memory;

(e) at least one wireless base station, servicing a given zone, connected to said mobile telephone terminal device for forming a wireless speech path with the portable telephone set in said wireless zone;

(f) at least one paging terminal device connected to said mobile telephone exchange for receiving said call signal and generating a wireless paging signal;

(g) at least one wireless transmission device, connected to said at least one paging terminal device, for sending out said wireless paging signal;

said at least one paging terminal device including:

(1) means for controlling operation of said wireless transmission device to page said wireless paging receiver of said portable telephone set via the wireless paging signal transmitted from said wireless transmission device;

(2) means for inquiring the station number of the calling terminal station included within said message;

(3) a third memory for storing the message received by said means for inquiring; and (4) a message transfer device for transferring the message to said second memory in said mobile telephone terminal device;

(h) means for comparing said response signal transmitted from said portable paging telephone set to said wireless base station with the message stored in said second memory; and (i) means for connecting said portable paging telephone set to said calling terminal station for a telephone communication.

* * * * *